United States Patent
Zhao et al.

(10) Patent No.: US 9,813,860 B2
(45) Date of Patent: Nov. 7, 2017

(54) GEO-FENCING BASED LOCATION DETECTION METHOD AND ELECTRONIC DEVICE

(71) Applicant: HISENSE MOBILE COMMUNICATIONS TECHNOLOGY CO., LTD., Qingdao (CN)

(72) Inventors: Linhu Zhao, Qingdao (CN); Tao Song, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 15/367,381

(22) Filed: Dec. 2, 2016

(65) Prior Publication Data

US 2017/0086020 A1    Mar. 23, 2017

(30) Foreign Application Priority Data

May 9, 2016    (CN) .......................... 2016 1 0305308

(51) Int. Cl.
| | | |
|---|---|---|
| *H04W 40/00* | (2009.01) | |
| *H04W 4/02* | (2009.01) | |
| *H04W 16/24* | (2009.01) | |

(52) U.S. Cl.
CPC ........... *H04W 4/021* (2013.01); *H04W 16/24* (2013.01)

(58) Field of Classification Search
CPC .. G06F 17/30241; H04W 16/24; H04W 4/021
USPC ... 455/456.3, 456.1, 456.2, 440, 410, 456.5, 455/404.2
See application file for complete search history.

(56) References Cited

U.S. PATENT DOCUMENTS

| | | | | |
|---|---|---|---|---|
| 5,963,956 A * | 10/1999 | Smartt | ............... | G06F 17/30241 |
| 7,164,986 B2 * | 1/2007 | Humphries | ............. | B60R 25/00 340/426.19 |
| 8,897,742 B2 * | 11/2014 | Johnson | ................... | H04W 4/02 370/331 |
| 2002/0188581 A1 * | 12/2002 | Fortin | ............... | G06F 17/30241 706/20 |
| 2005/0249426 A1 * | 11/2005 | Badawy | ................. | G06T 9/001 382/241 |
| 2013/0021271 A1 * | 1/2013 | Guo | ....................... | G06F 3/0386 345/173 |

(Continued)

*Primary Examiner* — Joseph Arevalo
(74) *Attorney, Agent, or Firm* — Harness, Dickey & Pierce, P.L.C.

(57) ABSTRACT

Disclosed are a geo-fencing based location detection method and electronic device, and the method includes: obtaining present geographic coordinates of a terminal, when an update of location of the terminal is detected; and checking whether or not the obtained geographic coordinates are within a rectangular coverage area denoted by any leaf node in a pre-built tree data structure, and if they are, obtaining an actual coverage area of a polygonal geo-fence within the rectangular coverage area; checking whether or not the geographic coordinates are in the actual coverage area of the polygonal geo-fence, and outputting a checking result.

14 Claims, 6 Drawing Sheets

(56) References Cited

U.S. PATENT DOCUMENTS

2013/0337841 A1\* 12/2013 Johnson ................. H04W 4/02
455/456.3

\* cited by examiner

GEO-FENCING BASED LOCATION DETECTION METHOD AND ELECTRONIC DEVICE

CROSS REFERENCE TO RELATED APPLICATION

This application claims the benefit and priority of Chinese Patent Application No. 201610305308.6 filed May 9, 2016. The entire disclosure of the above application is incorporated herein by reference.

FIELD

The present disclosure relates to the field of location based service, and particularly to a geo-fencing based location detection method and electronic device.

BACKGROUND

This section provides background information related to the present disclosure which is not necessarily prior art.

The Location Based Service (LB S) is a value added service which obtains the location information such as the geographical coordinates or the geodetic coordinates, of a mobile terminal user, through wireless communication networks of telecommunication mobile operators such as the Global System for Mobile Communication (GSM) networks or the Code Division Multiple Access (CDMA) networks, or external locating such as the Global Positioning System, and provides corresponding services supported by the Geographic Information System (GIS) platform, to the user.

Geo-fencing is a kind of application of the LBS. It uses a virtual fence to create a virtual geographic boundary, and when a mobile phone enters or exits a certain geographic area or is active in that area, the mobile phone may receive an automatic notification and an alert. Geo-fencing technology could not only be used with work, life assistant service, child location service, smart home service, and etc., but could be combined with internet and cloud computing technologies to share the fencing information among several users or in the cloud, so as to accomplish more social applications with interactive functions which brings convenience and amusement to the life of people. With the development of technologies, apart from GPS or network, multiple kinds of technologies like Bluetooth, Wireless Fidelity (WIFI), and etc., can be used to assist in positioning for geo-fencing, which could improve the positioning precision but lower the power consumption as much as possible. As such, geo-fencing would certainly be widely used.

SUMMARY

This section provides a general summary of the disclosure, and is not a comprehensive disclosure of its full scope or all of its features.

Embodiments of the disclosure provide a geo-fencing based location detection method and electronic device, in order to improve the precision of location detection.

In an aspect, embodiments of the disclosure provides a geo-fencing based location detection method, including:

obtaining present geographic coordinates of a terminal, when an update of location of the terminal is detected;

checking whether or not the obtained geographic coordinates are within a rectangular coverage area denoted by any leaf node in a pre-built tree data structure, and if they are, obtaining the actual coverage area of a polygonal geo-fence within the rectangular coverage area, checking whether or not the geographic coordinates are in the actual coverage area of the polygonal geo-fence, and outputting the checking results, where the polygonal geo-fence is a preset geo-fence, an outer contour of which is a closed polygon, and the tree data structure is a dynamic balanced tree structure which uses the minimum bounding rectangle of the polygonal geo-fence as a leaf node and is pre-built according to predetermined building rules of tree data structure.

In another aspect, embodiments of the disclosure provides an electronic device, including:

at least one processor;

a memory communicatively connected with the at least one processor, where:

the memory stores therein instructions executable by the at least one processor, wherein the instructions are executed by the at least one processor to enable the at least one processor to perform:

obtaining present geographic coordinates of a terminal, when an update of location of the terminal is detected;

checking whether or not the obtained geographic coordinates are within a rectangular coverage area denoted by any leaf node in a pre-built tree data structure, and if they are, obtaining the actual coverage area of a polygonal geo-fence within the rectangular coverage area; checking whether or not the geographic coordinates are in the actual coverage area of the polygonal geo-fence, and output the checking results, where the polygonal geo-fence is a preset geo-fence, an outer contour of which is a closed polygon, and the tree data structure is a dynamic balanced tree structure which uses the minimum bounding rectangle of the polygonal geo-fence as a leaf node and is pre-built according to predetermined building rules of tree data structure.

In another aspect, embodiments of the disclosure provide a nonvolatile computer storage medium which stores computer-executable instructions for performing the geo-fencing based location detection method described above.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

In related art, the geo-fence of Android platform is set to be round fence. When using an Android device, a user may create a round geo-fence by specifying the longitude, the latitude and the radius. The location based service would continuously check the relative location relationship between the device and the fence and when discovering that the device is entering or exiting the fenced area, it would broadcast a notification or an alert.

However, in real life most places are rectangular or polygonal, so if a round fence is created on the peripheries of a polygonal building, an extra area must exist in the fenced area, and particularly when the building is quite narrow and long, the extra area would be much larger than the area occupied by the building itself, resulting low precision of sending notifications or alerts.

Therefore, the disclosure provides a geo-fencing based location detection method and device, where:

First, in the disclosure, the outer contour of a geo-fence could be set to be a closed polygon. In situations where the target area is polygonal, the disclosure could allow a user to set a polygonal geo-fence, so as to select the polygonal target area precisely without selecting an extra area which doesn't belong to the target area, thereby guaranteeing the precision of the set geographic fence.

Second, in the disclosure, a polygonal geo-fence could be stored in tree structure. In the disclosure, the index of a polygonal geo-fence is determined as a leaf node of a tree structure, and the tree structure is built according to building rules of tree structure. In this way, when there are a large number of polygonal geographic fences at the same time, it would improve the precision and efficiency of searching and detecting by using a tree structure searching algorithm. Certainly, when a user chooses to delete a polygonal geo-fence, in the disclosure, deleting algorithm of the tree structure could be used to delete the chosen polygonal geo-fence, to guarantee the dynamic balance of the tree structure, and to improve the overall processing efficiency of the system.

Also, the disclosure may be applied to various kinds of terminals such as handheld devices, mobile phones, tablet computers, vehicle mounted equipment and so on, and is particularly applicable to handheld or vehicle mounted devices based on Android system.

Figure 1:
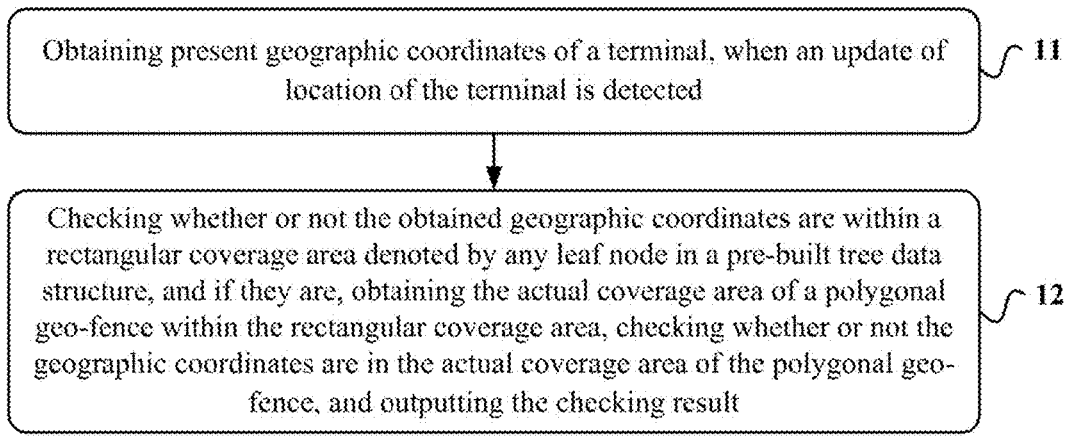
FIG. 1 is a flow chart of a geo-fencing based location detection method according to some embodiments of the disclosure.

FIG. 1 illustrates a flow chart of a geo-fencing based location detection method according to embodiments of the disclosure. As illustrated in FIG. 1, the flow may include:

Operation 11: obtaining present geographic coordinates of a terminal, when an update of location of the terminal is detected;

Operation 12: checking whether or not the obtained geographic coordinates are within a rectangular coverage area denoted by any leaf node in a pre-built tree data structure, and if they are, obtaining the actual coverage area of a polygonal geo-fence within the rectangular coverage area, checking whether or not the geographic coordinates are in the actual coverage area of the polygonal geo-fence, and outputting the checking result, where the polygonal geo-fence is a preset geo-fence, an outer contour of which is a closed polygon, and the tree data structure is a dynamic balanced tree structure which uses the minimum bounding rectangle of the polygonal geo-fence as a leaf node and is pre-built according to predetermined building rules of tree data structure.

In at least one embodiment, the tree structure in the disclosure could be, for example, an R-tree, an R+ tree, an R* tree, a Hilbert R-tree, an X-tree and so on. To better understand the disclosure, R-tree is taken as an example in the following descriptions, but the tree structure is not limited to R-tree structure.

In at least one embodiment, the polygonal geo-fence may be preset by:

obtaining the geographic coordinates of the points clicked by the user for selecting a target area, after polygonal geo-fence setting mode is enabled;

determining whether or not the number of the clicked points is not less than three, and if so, setting a polygonal geo-fence, the outer contour of which is a closed polygon, according to the geographic coordinates and the clicking order of the clicked points.

In at least one embodiment, after obtaining the geographic coordinates of the points clicked by the user for selecting the target area, the geographic coordinates of the corresponding points are saved in turn in a preset dynamic array, according to the clicking order of the user.

If it is determined that the number of the clicked points is not less than three, setting a polygonal geographical fence, the outer contour of which is a closed polygon, according to the geographic coordinates and the clicking order of the clicked points, includes:

if it is determined that the number of pairs of geographic coordinates of the saved points in the dynamic array is not less than three, setting a polygonal geographical fence with an outer contour thereof as a closed polygon according to the geographic coordinates and the saving order of the geographic coordinates of the points saved in the dynamic array.

In at least one embodiment, the minimum bounding rectangle of the polygonal geo-fence may be constructed in the following way: among the geographic coordinates of all the points forming the polygonal geo-fence saved in the dynamic array, finding a maximum latitude $X_{max}$, a minimum latitude $X_{min}$, a maximum longitude $Y_{max}$ and a minimum longitude $Y_{min}$, using the points $(X_{max}, Y_{max})$ and $(X_{min}, Y_{min})$ respectively as vertexes of the minimum bounding rectangle of the polygonal geo-fence, and using the line between the points $(X_{max}, Y_{max})$ and $(X_{min}, Y_{min})$ as a diagonal of the minimum bounding rectangle, to construct the minimum bounding rectangle of the polygonal geo-fence.

In at least one embodiment, the R-tree structure may be built in the following way: each time when a newly constructed minimum bounding rectangle of a polygonal geo-fence is obtained, using the coordinates of the vertexes of the minimum bounding rectangle which are $(X_{max}, Y_{max})$ and ($X_{min}$, $Y_{min}$) as the index of the corresponding node in the R-tree structure, and adding this node as a leaf node into the R-tree structure according to predetermined building rules of the R-tree.

In at least one embodiment, in the said operation 12, recursive searching may be performed on each branch of the R-tree structure, in an order that is from a root node to a leaf node. If the recursive searched node is a root node or a branch node, then determining the terminal is not within the coverage area of any polygonal geo-fence. If the recursive searched node is a leaf node, then obtaining the actual coverage area of the polygonal geo-fence corresponding to the leaf node, using a preset ray equation to construct a ray starting from the geographic coordinates, counting the number of intersections at which the ray and the boundary of the polygonal geo-fence intersect, and if the number of intersections is determined as an odd number, determining the terminal is within the actual coverage area of the polygonal geo-fence, and if the number of intersections is determined as an even number, determining the terminal is not within the actual coverage area of the polygonal geo-fence.

Following are detailed descriptions of embodiments of the disclosure.

According to embodiments of the disclosure, the function of setting a polygonal fence on an Android device is realized, and a complete system which includes a user interface, data storage for the polygonal geo-fence and an algorithm for detecting a device's state of entering or exiting the fence, is designed.

Figure 2:
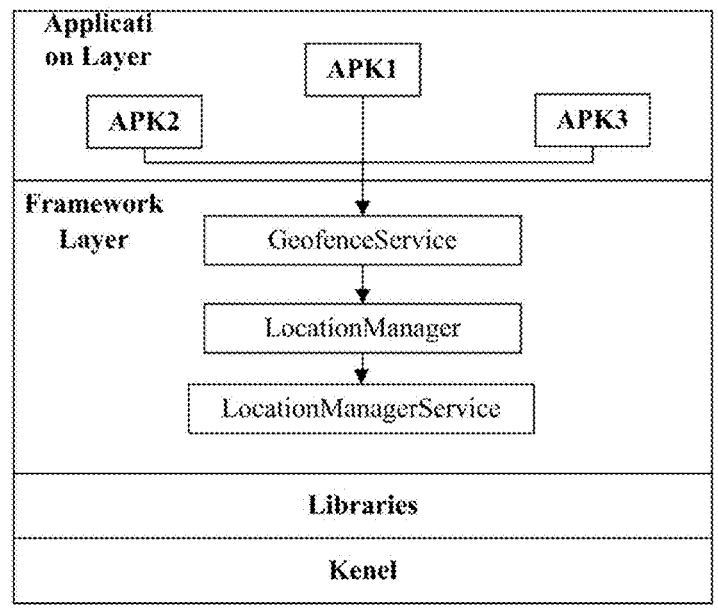
FIG. 2 is a schematic diagram of an application architecture design according to some embodiments of the disclosure.

The architectural structure of embodiments of the disclosure mainly includes two parts: an APK in the application layer and a backend service in the Framework layer called GeofenceService. FIG. 2 illustrates a schematic diagram of the application architecture design according to embodiments of the disclosure. As illustrated in FIG. 2, the APK in the application layer is mainly responsible for collecting data and transmitting the data to GeofenceService for processing, when GeofenceService detects that an Android device is entering or exiting a polygonal fence, it would send a broadcast to APK in the application layer, and the application layer needs to function correspondingly upon receiving the broadcast, for example location reminding; GeofenceService is responsible for receiving the polygonal fence data transmitted by the APK to generate an R-tree, checking whether or not a longitude and latitude is within the area of a certain fence or just exited the area of a certain fence after having monitored a location state change, and then sending a broadcast to the application layer.

Figure 3:
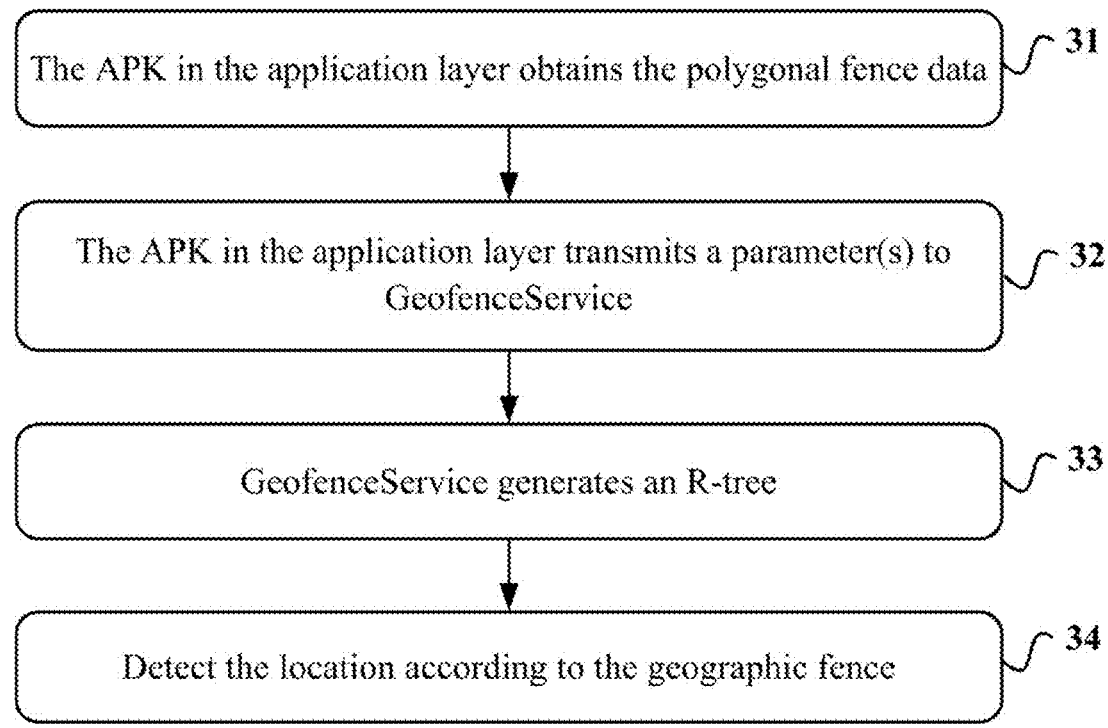
FIG. 3 is a flow chart of a method for detecting an Android terminal's entering into a polygonal geo-fence according to some embodiments of the disclosure.
Figure 4:
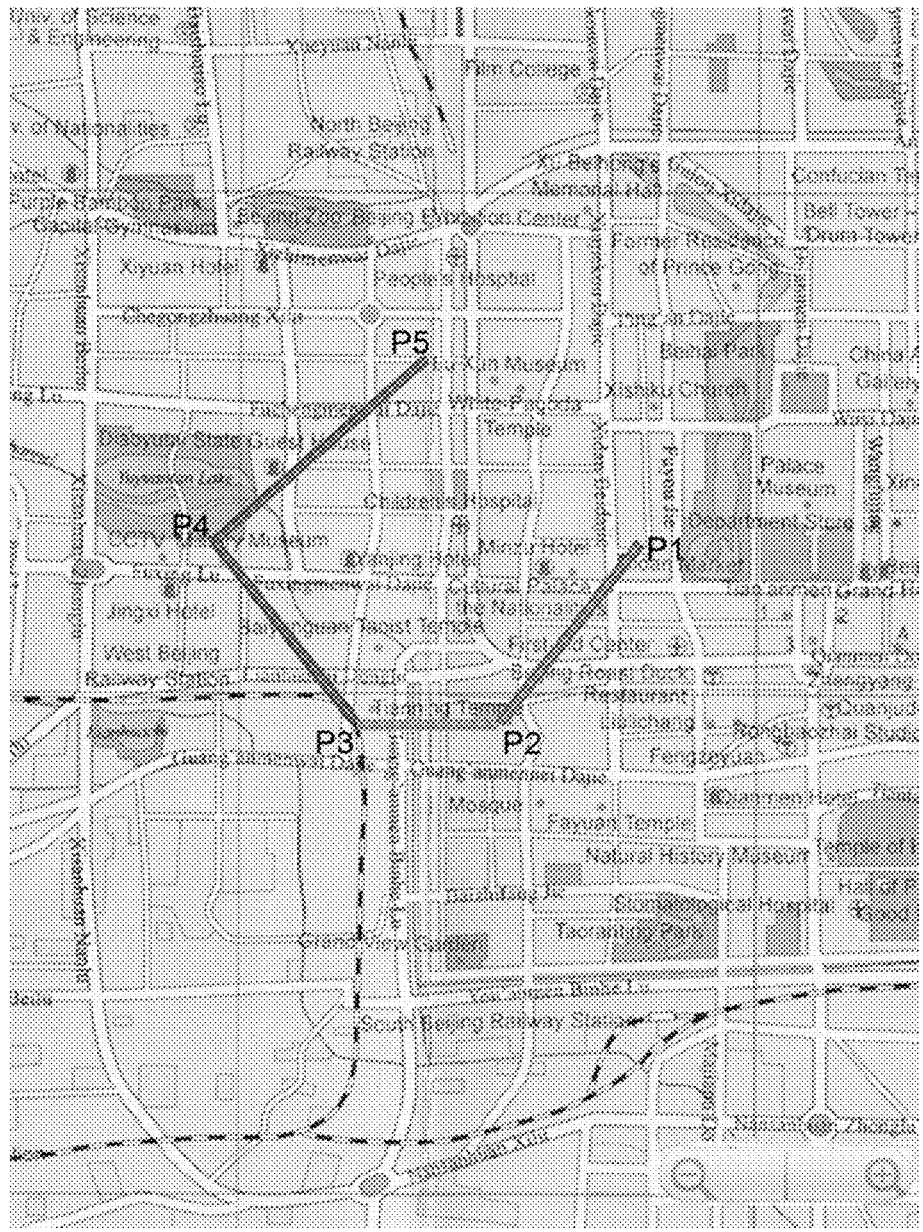
FIG. 4 is a schematic diagram of a polygonal geo-fence according to some embodiments of the disclosure.
Figure 5:
FIG. 5 is a schematic diagram of the minimum bounding rectangle for constructing a polygonal geo-fence according to some embodiments of the disclosure.
Figure 6:
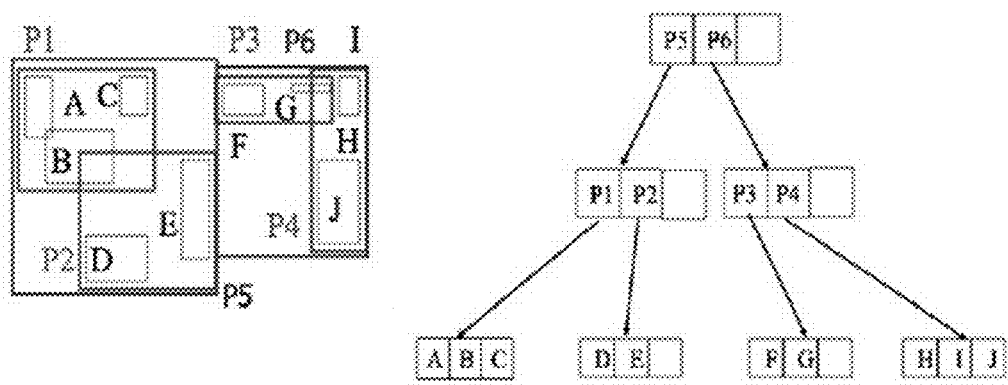
FIG. 6 is a schematic diagram of the present R-tree structure according to some embodiments of the disclosure.
Figure 7:
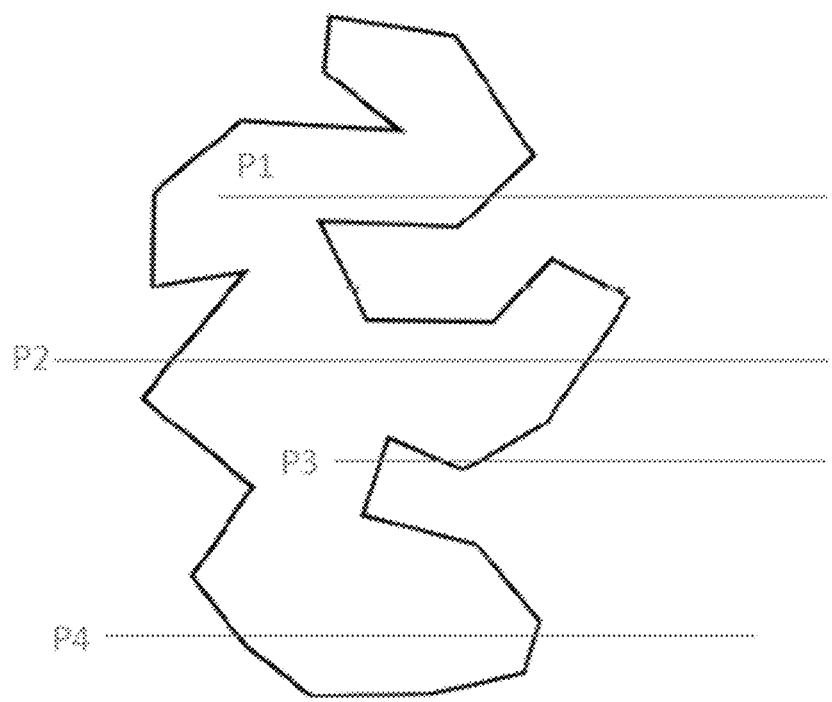
FIG. 7 is a schematic diagram of the ray search method according to some embodiments of the disclosure.

FIG. 3 illustrates a flow chart of a method for detecting an Android terminal's entering into a polygonal geo-fence according to embodiments of the disclosure. FIG. 4 illustrates a schematic diagram of a polygonal geo-fence according to embodiments of the disclosure. FIG. 5 illustrates a schematic diagram of the minimum bounding rectangle for constructing a polygonal geo-fence according to embodiments of the disclosure. FIG. 6 illustrates a schematic diagram of the present R-tree structure according to embodiments of the disclosure. FIG. 7 illustrates a schematic diagram of the ray search method according to embodiments of the disclosure.

The following descriptions take an Android terminal based on the application architecture illustrated in FIG. 2 as an example. As illustrated in FIG. 3, a method for detecting the Android terminal's entering into a polygonal geo-fence may include the following operations.

Operation 31: the APK in the application layer obtains the polygonal fence data.

In at least one embodiment, a third party map is needed for the APK in the application layer obtaining the polygonal fence data. For example, in the disclosure, "start" and "finish" button may be added in the map interface, when a user click the "start" button, the polygonal geographical fence customized mode is enabled, and the drawing flow of the polygonal fence's boundaries is started.

Each time the user clicks a point P1 on the map, obtain the longitude and latitude of its location by using an interface provided by the map, and save it in a dynamic array called ArrayList. When the user clicks a next point P2, add the longitude and latitude of P2 into ArrayList. If the user wants to set a polygonal fence, at least three points are supposed to be chosen. When the user clicks "finish" button, check the number of points clicked by the user and if it is determined the number is not less than three, draw a polygon according to the saving order of the coordinates in ArrayList. Referring to FIG. 4, in embodiments of the disclosure, when the user inputs five points P1-P5 to select a target area, connect P1 and P2, P2 and P3, P3 and P4, P4 and P5 in turn and connect P5 and P1 at last, then a geo-fence with an outer contour thereof as a closed polygon is drawn and the polygonal area selected by the user could be shown on the map. And then transmit the coordinate data saved in ArrayList to GeofenceServices.

Operation 32: the APK in the application layer transmits a parameter(s) to GeofenceService.

In at least one embodiment, when the APK transmits parameters to GeofenceService, at least two parameters should be transmitted, one of which is the coordinate data array ArrayList of the polygonal fence collected in Operation 31, and the other is PendingIntent, which is used to generate a broadcast informing the APK in the application layer when detecting the device is entering or exiting the area of a certain fence. Each APK should ensure the uniqueness of the PendingIntent set by itself, otherwise a PendingIntent set earlier would be overwritten by a same Pending Intent set later, resulting invalidity of the fence set earlier.

Operation 33: GeofenceService generates an R-tree.

In at least one embodiment, polygons can be approximated in a uniform way regardless of the different shapes of the polygons. For example, the minimum bounding rectangle of a polygon could be used to represent the polygon. First of all, look for a maximum longitude $Y_1$ and a minimum longitude $Y_2$, as well as a maximum latitude $X_1$ and a minimum latitude $X_2$, in ArrayList sent by the application layer. And then, referring to FIG. 5, construct a minimum bounding rectangle A outside the polygonal geo-fence by using ($X_1$, $Y_1$) and ($X_2$, $Y_2$) as the coordinates of diagonal vertexes of the rectangle, determine MBR={($X_1$, $Y_1$), ($X_1$, $Y_1$)} as the index of the minimum bounding rectangle of the polygonal area, and add the minimum bounding rectangle A into the R-tree structure according to insertion rules of the R-tree structure, to finally complete the building of the R-tree structure.

According to the embodiments of the disclosure, diagonal vertexes of the constructed minimum bounding rectangle of each diagonal geo-fence are used as an index of the leaf node of the R-tree structure, and thus a dynamic balanced R-tree is built according to building rules of the R-tree.

For example, as illustrated in FIG. 6, rectangle A to rectangle J represent 9 constructed minimum bounding rectangles of polygonal geographic fences. When building a dynamic balanced R-tree, in embodiments of the disclosure, minimum bounding rectangle P1 including rectangle A, rectangle B and rectangle C could be used as a branch node which is at a higher level of the leaf node, also in embodiments of the disclosure minimum bounding rectangle P2 including rectangle D and rectangle E could be used as a child node which is at a higher level of the leaf node, also in embodiments of the disclosure minimum bounding rectangle P3 including rectangle F and rectangle G could be used as a branch node which is at a higher level of the leaf node, also in embodiments of the disclosure minimum bounding rectangle P4 including rectangle H and rectangle J could be used as a branch node which is at a higher level of the leaf node, and in this way, rectangles P1 to P4 are constructed. Again follow the building rules of the R-tree, minimum bounding rectangle P5 including rectangle P1 and rectangle P2 could be used as a root node of the R-tree structure, also minimum bounding rectangle P6 including rectangle P3 and rectangle P4 could be used as a root node of the R-tree structure, and in this way, the building process of the R-tree structure is finished. Of course, embodiments of the disclosure only describe with 9 preset polygonal geo-fences as an example, and thus the R-tree structure is built only according to these 9 polygonal geo-fences. When inserting a newly constructed polygonal geo-fence, the inserting rules of the R-tree should also be followed, and the insertion of the leaf node could be based upon inserting algorithm of the R-tree. In fact, because inserting different leaf nodes might cause disintegration or growing taller of the R-tree structure, no more examples will be given here. Similarly, when deleting a constructed polygonal geo-fence, deleting rules of the R-tree should also be followed and the leaf node could be deleted based upon deleting algorithm of the R-tree. In fact, because deleting different leaf nodes might also cause disintegration or growing taller of the R-tree structure, no more examples will be given here.

Operation 34: detect the location according to the geographic fence.

In at least one embodiment, GeofenceService would call an interface in LocationManager and request to update the location information of the terminal regularly through network or GPS. When GeofenceService monitors a location update, first, it would search in the R-tree whether or not the location coordinates are in the coverage area of the minimum bounding rectangle of a certain polygonal geo-fence, and then, when the location coordinates are in the coverage area of the minimum bounding rectangle of a certain polygonal geo-fence, further judge whether or not the location coordinates are in the actual coverage area of the corresponding polygonal geo-fence by using ray method.

Following are the descriptions of the searching process with the R-tree structure illustrated by FIG. 6 as an example.

First, start to search from a root node of the R-tree structure, and compare the present GPS coordinates $(X_n, Y_n)$ with the index of P5. It is assumed that the index of P5 is MBR={$(X_5, Y_5), (X_6, Y_6)$}, if $X_5 \leq X_n \leq X_6$ and $Y_5 \leq Y_n \leq Y_6$, then determine that the present GPS coordinates are in the area of P5. Then continue to search branch node P1 and branch node P2 of P5 in recursive manner, and determine whether or not the present GPS coordinates are in the area of P1 or P2 according to the rules above. If the present GPS coordinates is indeed within a certain polygonal geo-fence, then a leaf node would finally be searched. If the leaf node the present GPS coordinates belong to is not found in the recursive manner, then the node the present GPS coordinates belong to is a root node or a branch node, or the present GPS coordinates don't belong to any of the nodes.

It should be explained that, in the searching process above, if there are N leaf nodes in an R-tree, then the average level of searching complexity of the R-tree searching algorithm is O(log(N)), and the searching efficiency could be highly improved when the N is relatively big.

If finally the present GPS coordinates are determined to be in minimum bounding rectangle E, then it needs to be further judged whether or not the present GPS coordinates are in the actual coverage area of the polygonal geo-fence enclosed by E. The judging method could be ray method, the principles of which are: starting from the present GPS coordinates $(X_n, Y_n)$ to construct a ray along the positive X axis, finding the intersections at which the ray and the boundary of the polygonal geo-fence intersect, counting the number of the intersections, determining that the present GPS coordinates are within the polygonal geo-fence if the number of the intersections is determined to be odd, and determining the present GPS coordinates outside the polygonal geographic fence if the number of the intersections is determined to be even. The ray method is applicable to both convex polygon and non-convex polygon and its level of searching complexity is O(N), where N is the number of sides of the polygonal geo-fence.

For example, referring to FIG. 7, if the present GPS coordinates are P1, then construct a ray starting from P1 and along the positive X axis, count the intersections at which the ray and boundary of the polygonal geo-fence intersect. As can be seen, in embodiments of the disclosure, the number of intersections at which the ray starting from P1 and the boundary of the polygonal geo-fence intersect is 1, and thus P1 lies within the polygonal geo-fence.

For example, still referring to FIG. 7, if the present GPS coordinates are P2, then construct a ray starting from P2 and along the positive X axis, count the intersections at which the ray and the boundary of the polygonal geo-fence intersect. As can be seen, in embodiments of the disclosure, the number of intersections at which the ray starting from P2 and the boundary of the polygonal geo-fence intersect is 2, and thus P2 lies outside the polygonal geographic fence.

For example, still referring to FIG. 7, if the present GPS coordinates are P3, then construct a ray starting from P3 and along the positive X axis, count the intersections at which the ray and the boundary of the polygonal geo-fence intersect. As can be seen, in embodiments of the disclosure, the number of intersections at which the ray starting from P3 and the boundary of the polygonal geo-fence intersect is 3, and thus P3 lies within the polygonal geographic fence.

For example, still referring to FIG. 7, if the present GPS coordinates are P4, then construct a ray starting from P4 and along the positive X axis, count the intersections at which the ray and the boundary of the polygonal geo-fence intersect. As can be seen, in embodiments of the disclosure, the number of intersections at which the ray starting from P4 and the boundary of the polygonal geo-fence intersect is 2, and thus P4 lies outside the polygonal geographic fence.

It could be seen from the technological solutions above that embodiments of the disclosure provides a geo-fencing based location detection method, in which when the target area is a rectangular or polygonal area such as most of the buildings, park, parking area and so on, the disclosure could precisely select the polygonal target area and make it a geo-fence with an outer contour thereof as a closed polygon, and then use the selected polygonal geo-fence as a leaf node of a R-tree structure to build the R-tree structure, thereby allowing a user to set any polygonal geo-fence randomly, solving the problem that only round geo-fence could be set, making the polygonal geo-fence be able to precisely select the polygonal geographic area without selecting other extra area, and thus improving the precision of the location based service. Furthermore, the disclosure could use a constructed polygonal geo-fence to build a R-tree structure and perform location detection in the way of R-tree indexing, thereby improving the precision and efficiency of detecting a terminal's entering and exiting the fence.

Figure 8:
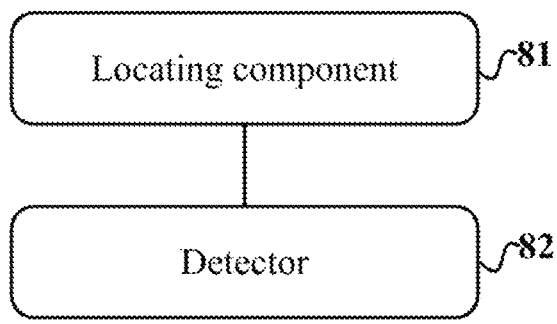
FIG. 8 is a structural schematic diagram of a geo-fencing location detection device according to some embodiments of the disclosure.

Based on the same technological conception, the disclosure also provides a geo-fencing based location detection device, as illustrated in FIG. 8, which illustrates a structural schematic diagram of a geo-fencing based location detection device, the device includes:

locating component 81, adapted to obtain the present geographic coordinates of a terminal when an update of location of the terminal is detected;

detector 82, adapted to check whether or not the obtained geographic coordinates are within a rectangular coverage area denoted by any leaf node in a pre-built tree data structure, and if they are, to obtain the actual coverage area of a polygonal geo-fence within the rectangular coverage area; to check whether or not the geographic coordinates are in the actual coverage area of the polygonal geo-fence, and to output the checking results, where the polygonal geo-fence is a preset geo-fence, an outer contour of which is a closed polygon, and the tree data structure is a dynamic balanced tree structure which uses the minimum bounding rectangle of the polygonal geo-fence as a leaf node and is pre-built according to predetermined building rules of tree data structure.

In at least one embodiment, the detector 82 is adapted to:
obtain the geographic coordinates of the points clicked by the user for selecting a target area, after polygonal geo-fence setting mode is enabled;

determine whether or not the number of the clicked points is not less than three, and if so, setting a polygonal geo-fence, the outer contour of which is a closed polygon, according to the geographic coordinates and the clicking order of the clicked points.

In at least one embodiment, after obtaining the geographic coordinates of the points clicked by the user for selecting a target area, the detector 82 is further adapted to save the geographic coordinates of the corresponding points in a preset dynamic array.

The detector 82 adapted to, if it is determined that the number of the clicked points is not less than three, set a polygonal geographical fence, the outer contour of which is a closed polygon, according to the geographic coordinates and the clicking order of the clicked points, is particularly adapted to:

if it is determined that the number of pairs of geographic coordinates of the saved points in the dynamic array is not less than three, set a polygonal geographical fence with an outer contour thereof as a closed polygon, according to the geographic coordinates and the saving order of the geographic coordinates of the points saved in the dynamic array.

In at least one embodiment, the detector 82 is particularly adapted to:

among the geographic coordinates of all the points forming the polygonal geo-fence saved in the dynamic array, to find a maximum latitude $X_{max}$, a minimum latitude $X_{min}$, a maximum longitude $Y_{max}$ and a minimum longitude $Y_{min}$; using the points $(X_{max}, Y_{max})$ and $(X_{min}, Y_{min})$ respectively as vertexes of the minimum bounding rectangle of the polygonal geo-fence, and to use the line between the points $(X_{max}, Y_{max})$ and $(X_{min}, Y_{min})$ as a diagonal of the minimum bounding rectangle to construct the minimum bounding rectangle of the polygonal geo-fence.

In at least one embodiment, the detector 82 is particularly used to:

each time a newly constructed minimum bounding rectangle of a polygonal geo-fence is obtained, use the coordinates of the vertexes of the minimum bounding rectangle which are $(X_{max}, Y_{max})$ and $(X_{min}, Y_{min})$ as the index of the corresponding node in the R-tree structure, and add this node as a leaf node into the R-tree structure according to predetermined building rules of the R-tree.

In at least one embodiment, the detector 82 is particularly adapted to:

perform recursive searching on each branch of the R-tree structure, in an order that is from a root node to a leaf node; if the recursive searched node is a root node or a branch node, then determine the terminal is not within the coverage area of any polygonal geo-fence; if the recursive searched node is a leaf node, then obtain the actual coverage area of the polygonal geo-fence corresponding to the leaf node, use a preset ray equation to construct a ray starting from the geographic coordinates, count the number of intersections at which the ray and boundary of the polygonal geo-fence intersect, and if the number of intersections is determined as an odd number, determine the terminal is within the actual coverage area of the polygonal geo-fence, and if the number of intersections is determined as an even number, determine the terminal is not within the actual coverage area of the polygonal geographic fence.

Figure 9:
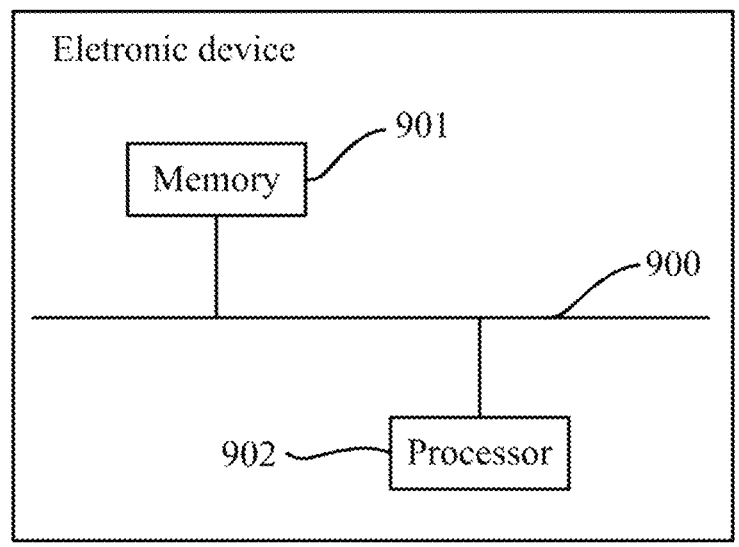
FIG. 9 is a structural schematic diagram of an electronic device according to some embodiments of the disclosure.

Based on the same disclosure conception, embodiments of the disclosure provide an electronic device. The electronic device includes a memory 901 and a processor 902, both of which could be connected via bus 900, or via specialized connection lines. In FIG. 9 it is taken as an example to connect via bus 900. Where the memory 901 is configured to store instructions and the processor 902 is configured to run the instructions stored by the memory 901, so as to perform the following operations when running the instructions:

obtaining present geographic coordinates of a terminal, when an update of location of the terminal is detected;

checking whether or not the obtained geographic coordinates are within a rectangular coverage area denoted by any leaf node in a pre-built tree data structure, and if they are, obtaining the actual coverage area of a polygonal geo-fence within the rectangular coverage area, checking whether or not the geographic coordinates are in the actual coverage area of the polygonal geo-fence, and outputting the checking results, where the polygonal geo-fence is a preset geo-fence, an outer contour of which is a closed polygon, and the tree data structure is a dynamic balanced tree structure which uses the minimum bounding rectangle of the polygonal geo-fence as a leaf node and is pre-built according to predetermined building rules of tree data structure.

In at least one embodiment of the disclosure, the tree data structure is an R-tree, an R+ tree, an R* tree, a Hilbert R-tree, or an X tree.

In at least one embodiment, the polygonal geo-fence is set through the following operations:

obtaining the geographic coordinates of the points clicked by the user for selecting a target area, after polygonal geo-fence setting mode is enabled;

determining whether or not the number of the clicked points is not less than three, and if so, setting a polygonal geo-fence, the outer contour of which is a closed polygon, according to the geographic coordinates and the clicking order of the clicked points.

In at least one embodiment, after obtaining the geographic coordinates of the points clicked by the user for selecting the target area, the geographic coordinates of the corresponding points are saved in turn in a preset dynamic array, according to the clicking order of the user.

If it is determined that the number of the clicked points is not less than three, setting a polygonal geographical fence, the outer contour of which is a closed polygon, according to the geographic coordinates and the clicking order of the clicked points, includes:

if it is determined that the number of pairs of geographic coordinates of the saved points in the dynamic array is not less than three, setting a polygonal geographical fence with an outer contour thereof as a closed polygon according to the geographic coordinates and the saving order of the geographic coordinates of the points saved in the dynamic array.

In at least one embodiment, the minimum bounding rectangle of the polygonal geo-fence may be constructed through the following operations:

among the geographic coordinates of all the points forming the polygonal geo-fence saved in the dynamic array, finding a maximum latitude $X_{max}$, a minimum latitude $X_{min}$, a maximum longitude $Y_{max}$ and a minimum longitude $Y_{min}$, using the points ($X_{max}$, $Y_{max}$) and ($X_{min}$, $Y_{min}$) respectively as vertexes of the minimum bounding rectangle of the polygonal geo-fence, and using the line between the points ($X_{max}$, $Y_{max}$) and ($X_{min}$, $Y_{min}$) as a diagonal of the minimum bounding rectangle, to construct the minimum bounding rectangle of the polygonal geo-fence.

In at least one embodiment, the R-tree structure may be built through the following operations:

each time a newly constructed minimum bounding rectangle of a polygonal geo-fence is obtained, using the coordinates of the vertexes of the minimum bounding rectangle which are ($X_{max}$, $Y_{max}$) and ($X_{min}$, $Y_{min}$) as the index of the corresponding node in the R-tree structure, and adding this node as a leaf node into the R-tree structure according to predetermined building rules of the R-tree.

In at least one embodiment, said checking whether or not the obtained geographic coordinates are within a rectangular coverage area denoted by any leaf node in the tree structure, includes:

performing recursive searching on each branch of the R-tree structure, in an order that is from a root node to a leaf node; if the recursive searched node is a root node or a branch node, then determining the terminal is not within the coverage area of any polygonal geo-fence; if the recursive searched node is a leaf node, then obtaining the actual coverage area of the polygonal geo-fence corresponding to the leaf node, using a preset ray equation to construct a ray starting from the geographic coordinates, counting the number of intersections at which the ray and the boundary of the polygonal geo-fence intersect, and if the number of intersections is determined as an odd number, determining the terminal is within the actual coverage area of the polygonal geo-fence, and if the number of intersections is determined as an even number, determining the terminal is not within the actual coverage area of the polygonal geographic fence.

The electronic device provided by the disclosure could be various kinds of handheld device such as a mobile phone, a tablet computer, or PDA and etc., which could include components such as, a processor with one or more processing core, a radio frequency circuit, a memory with one or more computer readable storage medium, an input device, a display device, a sensor, an audio circuit, a WiFi module, power supply and so on. Those skilled in the art could understand that the structure of the electronic device in the embodiments is not limited to the structure as illustrated in FIG. 9, and the electronic device may include more or fewer components, combine certain components or be configured with different components, where:

the radio frequency circuit could be adapted to receive and send signals during the process of sending and receiving information or a call. Usually, the radio frequency circuit include but not limit to an antenna, at least one amplifier, a tuner, one or more oscillators, a subscriber identification module (SIM) card, a transceiver, a coupler, a low noise amplifier (LNA), a diplexer and so on. In addition, the radio frequency circuit could communicate with other devices through wireless communications and networks as well. Said wireless communications could use any of the communication standards or protocols, including but not limited to Global System of Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS), and so on.

The memory could be adapted to store software programs and modules. The processor executes various functional applications and data processing by running the software programs and modules stored in the memory. The memory could mainly include a program storage area and a data storage area, where the program storage area could store an operating system, applications required by at least one function such as sound play function, image play function and so on, and etc., while the data storage area could store data created according to the use of the electronic device such as audio data and contact book, and the like. In addition, the memory could include a high-speed random-access memory or a non-volatile memory such as at least one magnetic disk storage device, flash memory device or another nonvolatile solid state storage device. Accordingly, the memory could further include a memory controller, to provide the processor and the input device with access to the memory.

The input device could be used to receive input number or character information, as well as to generate signal input to keyboard, mouse, operating lever, optical or trackball that is related to user configurations and function control. Specifically, the input device could include a touch sensitive surface or another input device. A touch sensitive surface, which is also called touch display or touch control panel, could collect a user's touch operations on or near it, for example, operations of a user using any suitable object or accessory such as a finger or a stylus on or near the touch sensitive surface, and drive a corresponding connection apparatus according to a preset program. Optionally, the touch sensitive surface could include a touch detection apparatus and a touch controller, where the touch detection apparatus detects the position touched by the user and the signal caused by the touch operation, and sends the signal to the touch controller, and the touch controller receives touching information from the touch detection apparatus, transforms it into the coordinates of touch points, and then sends the coordinates to the processor, and the touch controller could also receive orders from the processor and execute the orders. In addition, there are a variety of technologies with different methods of sensing touch, such as resistive touch, capacitive touch, infra touch, surface acoustic wave touch and so on. Apart from the touch sensitive surface, the input device could also include other devices. Specifically, the other devices could include but are not limited to one or more of a physical keyboard, a function key like a volume control push button, a switch key and so forth, a trackball, a mouse, an operating lever and so on.

The display device could be used to show information input by a user or provide information or various graphical user interfaces of the electronic device to a user, where the graphical user interfaces could include one or combination of graphic, texts, icons, and videos. The display device could include a display panel which optionally, could be configured in forms like Liquid Crystal Display (LCD), Organic Light-Emitting Diode (OLED) and so on. Furthermore, the touch sensitive surface could cover the display panel, and when detecting a touch operation on or near it, the touch sensitive surface sends the touching information to the processor to determine the type of the touch event, and then the processor provides corresponding visual output on the display panel according to the type of the touch event. In this embodiment, the touch sensitive surface and the display panel implement input and output functions as two independent components, however in certain embodiments, the touch sensitive surface and the display panel could be integrated to implement input and output functions.

The electronic device could further include at least one kind of sensor, such as a light sensor, a motion sensor or other sensors. Specifically, the light sensor could include an ambient light sensor and a proximity sensor, where the ambient light sensor could adjust the brightness of the display panel according to the brightness of the ambient light, the proximity sensor could, when the electronic device moves near an ear, turn off the display panel and/or backlight. As a kind of motion sensor, a gravity acceleration sensor could detect the magnitude of an acceleration in each direction (usually on three axes), and when an object is still, the gravity acceleration sensor could detect the magnitude and direction of the object. A gravity acceleration sensor could be used in applications which identify the posture of a mobile phone such as a screen switch, related games or a posture calibration of a magnetometer, and could be used to implement functions related to vibration identification such as a pedometer or percussion, and other applications or functions. As to other sensors with which the electronic device could be configured, such as a gyroscope, a barometer, a hygrometer, a thermometer, an infrared sensor and so on, detailed descriptions will be omitted here.

The audio circuit, a loud speaker, and a microphone could provide an audio interface between a user and the electronic device. The audio circuit could send to the loudspeaker the electrical signal transformed from received audio data, the loudspeaker will transform the electrical signal into a sound signal and output it. On the other hand, the microphone transforms a collected sound signal into an electrical signal, the audio circuit receives the electrical signal, transforms it into audio data, and outputs the audio data to the processor to be processed, then the radio frequency circuit sends the audio data processed by the processor to, for example, another apparatus, or the audio circuit outputs the audio data to the memory for further processing. The audio circuit might further include an earphone jack to provide communications between external earphones and the electronic device.

WiFi is a kind of short-range wireless technology. With the help of a WiFi module of the electronic device, a user could receive or send an email, browse a webpage, visit streaming media, and etc. The Wifi module provides the user with a wireless wideband internet visit. Although a Wifi module is included in this embodiment, it could be understood that the Wifi module is not indispensable to constitute the electronic device, and could be omitted without changing the essence of the disclosure according to need.

The processor is the controlling part of the electronic device, which is connected with the respective parts above of the electronic device by various interfaces and circuits, by running or executing programs or/and modules stored in the memory, as well as by retrieving data stored in the memory, executes various functions of the electronic device and processes data, thereby monitoring the overall mobile telephone. Optionally, the processor could include one or more processing cores. Preferably, the processor could be integrated with an application processor and a modulation and demodulation processor, where the application processor primarily manages the operating system, user interface, applications and etc., and the modulation and demodulation processor primarily manage wireless communications. It could be understood that it is also possible that the modulation and demodulation processor are not integrated into the processor.

The electronic device also includes a power supply powering each component, e.g., a battery, and preferably, the power supply could connect with the processor logically via a power management system, thereby managing charging, discharging, power consumption, and so on via the power management system. The power supply could further include one or more than one unit like an AC or DC power supply, a recharging system, a power supply fault detection circuit, a power converter or inverter, a power supply status indicator and so on.

Although not illustrated, the electronic device could further include a camera, a Bluetooth module and so on, which will not be described in any details here. Particularly in this embodiment, the display device of the electronic device is a touch screen display, the electronic device further includes a memory, and one or more program stored therein which are configured to be executed by one or more processor.

Based on the same inventive conception, embodiments of the disclosure further provide a nonvolatile computer storage medium which stores computer-executable instructions for performing the geo-fencing based location detection method described above.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the disclosure have been described, those skilled in the art benefiting from the underlying inventive concept can make additional modifications and variations to these embodiments. Therefore the appended claims are intended to be construed as encompassing the embodiments and all the modifications and variations coming into the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A geo-fencing based location detection method, the method comprising:
obtaining present geographic coordinates of a terminal, when an update of location of the terminal is detected; and
checking whether the obtained geographic coordinates are within a rectangular coverage area denoted by any leaf node in a pre-built tree data structure, and if they are, obtaining an actual coverage area of a polygonal geo-fence within the rectangular coverage area, checking whether the geographic coordinates are in the actual coverage area of the polygonal geo-fence, and outputting a checking result,
wherein the polygonal geo-fence is a preset geo-fence, an outer contour of which is a closed polygon, and the tree data structure is a dynamic balanced tree structure which uses a minimum bounding rectangle of the polygonal geo-fence as a leaf node and is pre-built according to predetermined building rules of tree data structure, and
wherein the polygonal geo-fence is preset by obtaining geographic coordinates of points clicked by a user for selecting a target area, after a polygonal geo-fence setting mode is enabled, and determining whether a number of the clicked points is not less than three, and if so, setting a polygonal geo-fence, the outer contour of which is the closed polygon, according to the geographic coordinates and a clicking order of the clicked points.

2. The method according to claim 1, wherein the tree data structure is an R-tree, an R+ tree, an R* tree, a Hilbert R-tree, or an X-tree.

3. The method according to claim 1, wherein after obtaining the geographic coordinates of the points clicked by the user on a map for selecting the target area, the method further comprises:
saving the geographic coordinates of the corresponding points in a preset dynamic array in turn, according to the clicking order of the user; and
if it is determined that the number of the clicked points is not less than three, setting the polygonal geo-fence comprises:
if it is determined that a number of pairs of geographic coordinates of the saved points in the dynamic array is not less than three, setting the polygonal geo-fence according to the geographic coordinates and the saving order of the geographic coordinates of the points saved in the dynamic array.

4. The method according to claim 3, wherein the minimum bounding rectangle of the polygonal geo-fence is constructed in following operations:
among the geographic coordinates of all the points forming the polygonal geo-fence saved in the dynamic array, finding a maximum latitude $X_{max}$, a minimum latitude $X_{min}$, a maximum longitude $Y_{max}$ and a minimum longitude $Y_{min}$; and
using the points $(X_{max}, Y_{max})$ and $(X_{min}, Y_{min})$ respectively as vertexes of the minimum bounding rectangle of the polygonal geo-fence, and using a line between the points $(X_{max}, Y_{max})$ and $(X_{min}, Y_{min})$ as a diagonal of the minimum bounding rectangle, to construct the minimum bounding rectangle of the polygonal geo-fence.

5. The method according to claim 4, wherein the tree structure is built in following operations:
each time when a newly constructed minimum bounding rectangle of a polygonal geo-fence is obtained, using the coordinates of the vertexes of the minimum bounding rectangle which are $(X_{max}, Y_{max})$ and $(X_{min}, Y_{min})$ as an index of a corresponding node in the tree structure, and add this node as a leaf node into the tree structure according to a predetermined building rules of the tree.

6. The method according to claim 1, wherein said checking whether the obtained geographic coordinates are within a rectangular coverage area denoted by any leaf node in the pre-built tree structure, comprises:
performing recursive searching on each branch of the tree structure, in an order that is from a root node to a leaf node;
if it is determined that a recursive searched node is a root node or a branch node, then determining the terminal is not within the coverage area of any polygonal geo-fence; and
if it is determined that the recursive searched node is a leaf node, then obtaining the actual coverage area of the polygonal geo-fence corresponding to the leaf node, using a preset ray equation to construct a ray starting from the geographic coordinates, counting a number of intersections at which the ray and a boundary of the polygonal geo-fence intersect, and if the number of intersections is determined as an odd number, determining the terminal is within the actual coverage area of the polygonal geo-fence, and if the number of intersections is determined as an even number, determining the terminal is not within the actual coverage area of the polygonal geo-fence.

7. An electronic device, the device comprising:
at least processor; and
a memory communicatively connected with the at least one processor, wherein:
the memory stores therein instructions executable by the at least one processor, wherein the instructions are executed by the at least one processor to enable the at least one processor to perform:
obtaining present geographic coordinates of a terminal, when an update of location of the terminal is detected; and checking whether the obtained geographic coordinates are within a rectangular coverage area denoted by any leaf node in a pre-built tree data structure, and if they are, obtaining an actual coverage area of a polygonal geo-fence within the rectangular coverage area, checking whether the geographic coordinates are in the actual coverage area of the polygonal geo-fence, and outputting a checking result, wherein the polygonal geo-fence is a preset geo-fence, an outer contour of which is a closed polygon, and the tree data structure is a dynamic balanced tree structure which uses a minimum bounding rectangle of the polygonal geo-fence as a leaf node and is pre-built according to predetermined building rules of tree data structure, and wherein the instructions are executed by the at least one processor to enable the at least one processor to set the polygonal geo-fence by obtaining geographic coordinates of points clicked by a user for selecting a target area, after a polygonal geo-fence setting mode is enabled, and determining whether a number of the clicked points is not less than three, and if so, setting the polygonal geo-fence, the outer contour of which is a closed polygon, according to the geographic coordinates and a clicking order of the clicked points.

8. The electronic device according to claim 7, wherein the tree data structure is an R-tree, an R+ tree, an R* tree, a Hilbert R-tree, or an X-tree.

9. The electronic device according to claim 7, wherein after obtaining the geographic coordinates of the points clicked by the user on a map for selecting the target area, the instructions are executed by the at least one processor to further enable the at least one processor to perform saving the geographic coordinates of the corresponding points in a preset dynamic array; and if it is determined that the number of the clicked points is not less than three, setting the polygonal geo-fence comprises:
if it is determined that a number of pairs of geographic coordinates of the saved points in the dynamic array is not less than three, setting the polygonal geo-fence according to the geographic coordinates and the saving order of the geographic coordinates of the points saved in the dynamic array.

10. The electronic device according to claim 9, wherein the instructions are executed by the at least one processor to enable the at least one processor to construct the minimum bounding rectangle of the polygonal geo-fence through following operations:
among the geographic coordinates of all the points forming the polygonal geo-fence saved in the dynamic array, finding a maximum latitude $X_{max}$, a minimum latitude $X_{min}$, a maximum longitude $Y_{max}$ and a minimum longitude $Y_{min}$; and
using the points $(X_{max}, Y_{max})$ and $(X_{min}, Y_{min})$ respectively as vertexes of the minimum bounding rectangle of the polygonal geo-fence, and using a line between the points $(X_{max}, Y_{max})$ and $(X_{min}, Y_{min})$ as a diagonal of the minimum bounding rectangle, to construct the minimum bounding rectangle of the polygonal geo-fence.

11. The electronic device according to claim 10, wherein the instructions are executed by the at least one processor to enable the at least one processor to build the tree structure through following operations:
each time when a newly constructed minimum bounding rectangle of a polygonal geo-fence is obtained, using the coordinates of the vertexes of the minimum bounding rectangle which are $(X_{max}, Y_{max})$ and $(X_{min}, Y_{min})$ as an index of a corresponding node in the tree structure, and add this node as a leaf node into the tree structure according to a predetermined building rules of the tree.

12. The electronic device according to claim 7, wherein said checking whether the obtained geographic coordinates are within a rectangular coverage area denoted by any leaf node in the tree structure, comprises:
performing recursive searching on each branch of the tree structure, in an order that is from a root node to a leaf node;
if it is determined that a recursive searched node is a root node or a branch node, then determining the terminal is not within the coverage area of any polygonal geo-fence; and
if it is determined that the recursive searched node is a leaf node, then obtaining the actual coverage area of the polygonal geo-fence corresponding to the leaf node, using a preset ray equation to construct a ray starting from the geographic coordinates, counting a number of intersections at which the ray and a boundary of the polygonal geo-fence intersect, and if the number of intersections is determined as an odd number, determining the terminal is within the actual coverage area of the polygonal geo-fence, and if the number of intersections is determined as an even number, determining the terminal is not within the actual coverage area of the polygonal geo-fence.

13. A non-transitory computer-readable storage medium storing computer instructions that, when executed by a computer, cause the computer to:
obtaining present geographic coordinates of a terminal, when an update of location of the terminal is detected; and
checking whether the obtained geographic coordinates are within a rectangular coverage area denoted by any leaf node in a pre-built tree data structure, and if they are, obtaining an actual coverage area of a polygonal geo-fence within the rectangular coverage area, checking whether the geographic coordinates are in the actual coverage area of the polygonal geo-fence, and outputting a checking result,
wherein the polygonal geo-fence is a preset geo-fence, an outer contour of which is a closed polygon, and the tree data structure is a dynamic balanced tree structure which uses a minimum bounding rectangle of the polygonal geo-fence as a leaf node and is pre-built according to predetermined building rules of tree data structure, and
wherein the polygonal geo-fence is preset by obtaining geographic coordinates of points clicked by a user for selecting a target area, after a polygonal geo-fence setting mode is enabled, and determining whether a number of the clicked points is not less than three, and if so, setting the polygonal geo-fence, the outer contour of which is a closed polygon, according to the geographic coordinates and the clicking order of the clicked points.

14. The non-transitory computer-readable storage medium according to claim 13, wherein the tree data structure is an R-tree, an R+ tree, an R* tree, a Hilbert R-tree, or an X-tree.

* * * * *